(12) United States Patent
Higgins et al.

(10) Patent No.: US 11,128,538 B2
(45) Date of Patent: Sep. 21, 2021

(54) METHOD AND SYSTEM FOR AN INTERACTIVE, TANGIBLE SYSTEM FOR VISUALIZING, DESIGNING AND DEBUGGING DISTRIBUTED SOFTWARE APPLICATIONS

(71) Applicant: MASTERCARD INTERNATIONAL INCORPORATED, Purchase, NY (US)

(72) Inventors: Stephen Higgins, Cork (IE); Stephanie Finn, Bray (IE); Thomas Treitlinger, Lusk (IE); Rob Byrne, Wicklow (IE); Ojo K. Oluwasogo, Lagos (NG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 82 days.

(21) Appl. No.: 16/512,888

(22) Filed: Jul. 16, 2019

(65) Prior Publication Data
US 2021/0021483 A1    Jan. 21, 2021

(51) Int. Cl.
*H04L 12/24*    (2006.01)
*G06F 3/01*    (2006.01)
*G06F 3/0484*    (2013.01)
*G06F 3/0488*    (2013.01)
*G06F 3/041*    (2006.01)
(Continued)

(52) U.S. Cl.
CPC ............... *H04L 41/12* (2013.01); *G06F 3/017* (2013.01); *G06F 3/0484* (2013.01); *G06F 3/0488* (2013.01); *G06F 3/04162* (2019.05); *H04L 41/22* (2013.01); *H04L 41/0896* (2013.01);
(Continued)

(58) Field of Classification Search
CPC ....... H04W 4/80; H04W 64/00; H04W 8/005; H04L 41/22; H04L 41/24; H04L 41/12; H04L 41/0896; H04L 2012/5623; G06F 3/0488; G06F 3/044; G06F 3/04162; G06F 3/017; G06F 3/0484
See application file for complete search history.

(56) References Cited

U.S. PATENT DOCUMENTS 5,973,677 A    10/1999  Gibbons
6,408,257 B1    6/2002  Harrington et al.
(Continued)

*Primary Examiner* — Gregory G Todd
(74) *Attorney, Agent, or Firm* — Buchanan Ingersoll & Rooney PC

(57) ABSTRACT

A method for physically displaying and manipulating a communication network through physical objects and an interactive display includes: positioning, on a surface of an interactive display screen, a plurality of physical objects, each representing a node in a communication network; displaying a topography of the communication network including at least a plurality of nodes, where each node represented by a physical object is displayed beneath the respective physical object, and where open communication channels between nodes are visually displayed on the screen; receiving a physical gesture performed by a user between two of the plurality of physical objects; transmitting a signal to one of the physical objects or an access point of the communication network causing manipulation of the communication network based on the physical gesture; and updating the displayed topography of the communication network based on the manipulation of the communication network in real-time.

16 Claims, 5 Drawing Sheets

(51) Int. Cl.
*H04L 12/917* (2013.01)
*H04L 12/70* (2013.01)

(52) U.S. Cl.
CPC ...... *H04L 47/76* (2013.01); *H04L 2012/5623* (2013.01)

(56) References Cited

U.S. PATENT DOCUMENTS

| | | |
|---|---|---|
| 7,515,143 B2 | 4/2009 | Keam et al. |
| 7,719,523 B2 | 5/2010 | Hillis |
| 10,291,653 B2* | 5/2019 | Senanayake ........ G06F 3/04883 |
| 10,821,350 B1* | 11/2020 | Schukar .................. A63F 13/23 |
| 2013/0204408 A1* | 8/2013 | Thiruvengada ..... H04L 12/2827 700/90 |
| 2014/0133349 A1* | 5/2014 | Ninan ..................... H04L 47/00 370/254 |
| 2014/0327628 A1* | 11/2014 | Tijssen ................. G06F 3/0488 345/173 |
| 2018/0062939 A1* | 3/2018 | Kulkarni ............ H04L 41/0806 |
| 2020/0195463 A1* | 6/2020 | Johnson ............. H04L 12/2816 |

\* cited by examiner

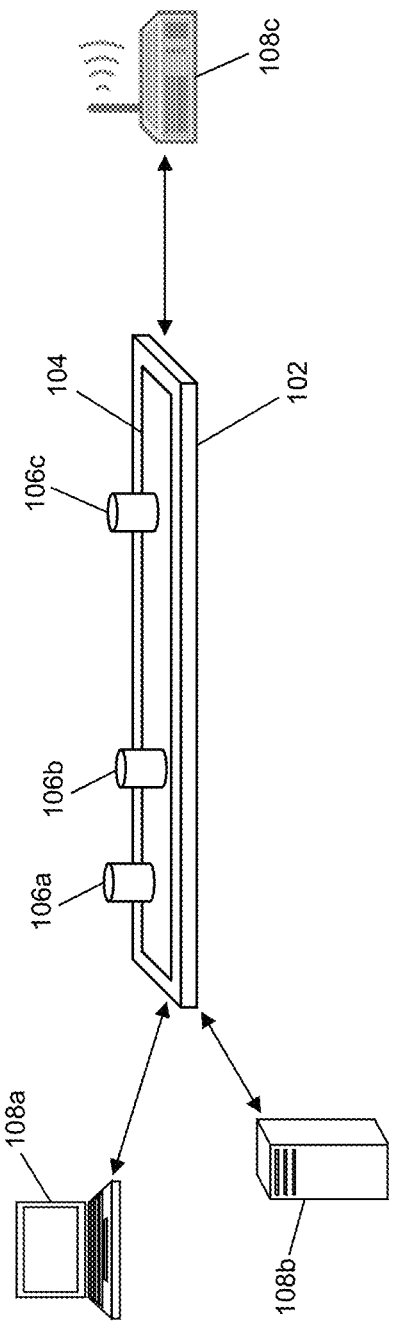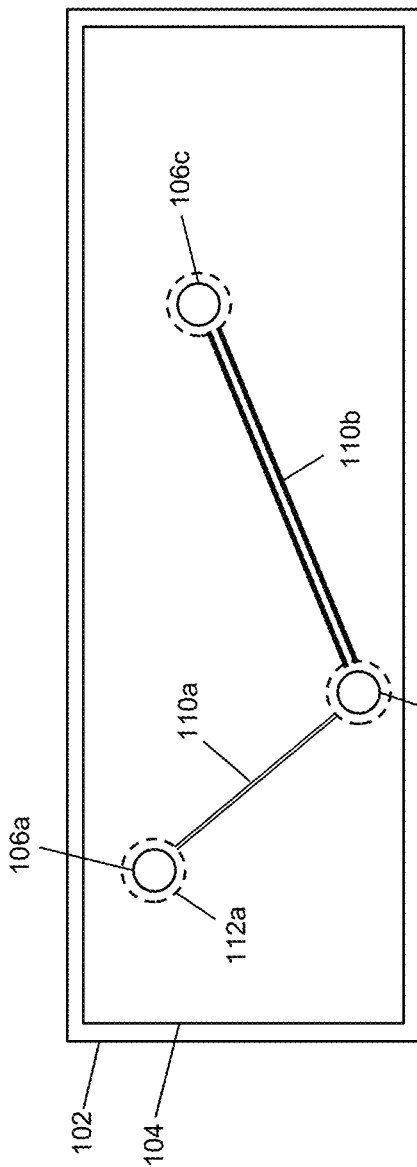
FIG. 1A
FIG. 1B

METHOD AND SYSTEM FOR AN INTERACTIVE, TANGIBLE SYSTEM FOR VISUALIZING, DESIGNING AND DEBUGGING DISTRIBUTED SOFTWARE APPLICATIONS

FIELD

The present disclosure relates to displaying and manipulating a distributed software application or communication network through an interactive system, specifically using an interactive display to enable a user to interact with and manipulate a distributed software application or communication network through physical gestures.

BACKGROUND

As communication technology has become more sophisticated over the years, so have communication networks as well as methods for taking advantage of these networks and more sophisticated technologies. In the past, a communication network was often limited to a hub and spoke model or other similar, simple topography that most laypersons could readily understand. However, technology has progressed to the point to where many different topographies may be used, even ones that may not be easy for a person to internally visualize, such as a mesh network. These types of networks have provided a number of advantages, in particular the ability for software applications to run in a distributed manner, where computing power is shared across multiple systems in a network.

As technology continues to improve, the types of networks and the sophistication of these networks, and the capabilities thereof, continues to get more complicated and harder for a layperson to follow and understand. In many cases, individuals can often learn faster and easier through a hands-on experience. Currently, there are limited options for an individual to be able to even visualize a complicated communication network, let alone interact with the network in some manner. Thus, there is a need for a system that can provide a visual representation of a communication network, such as one that executes distributed software applications, that is capable of interacting with a user to provide for a greater educational, and administrative, experience.

SUMMARY

The present disclosure provides a description of systems and methods for physically displaying and manipulating a communication network through physical objects and an interactive display. A large, interactive display is used to display a network topography. Physical objects are placed on the surface of the display, which is read by the display to represent nodes in a communication network. The objects can be manipulated to manipulate the represented nodes on the display, where the display also includes lines and other visual representations of the communication network. The display is configured to read gestures performed by the user, to perform corresponding actions with respect to the displayed communication network, where gestures can result in administrative actions, such as the creation or termination of a communication channel, increase or decrease of channel bandwidth, connection or disconnection of a node, etc. Additional gestures may provide more information to the user, such as being able to slow down or speed up the flow of time, visualize the flow of information, etc. The use of such an interactive display with physical objects and the use of gestures can help assist individuals in learning about a communication network and even performing managerial and administrative functions for the network in a manner that is accessible to unsophisticated users.

A method for physically displaying and manipulating a communication network through physical objects and an interactive display includes: positioning, on a surface of an interactive display screen, a plurality of physical objects, where each of the plurality of physical objects represents a node in a communication network; displaying, on the interactive display screen, a topography of the communication network including at least a plurality of nodes, where each of the plurality of nodes represented by one of the plurality of physical objects is displayed beneath the respective physical object, and where open communication channels between nodes in the plurality of nodes are visually displayed on the interactive display screen; receiving, by an input device interfaced with the interactive display screen, a physical gesture performed by a user involving one or more of the plurality of physical objects; transmitting, by a transmitter interfaced with the interactive display screen, a signal to one of the one or more physical objects or an access point of the communication network causing manipulation of the communication network based on the physical gesture; and updating, on the interactive display screen, the topography of the communication network based on the manipulation of the communication network in real-time.

A system for physically displaying and manipulating a communication network through physical objects and an interactive display includes: an interactive display screen having a surface; and a plurality of physical objects positioned on the surface of the interactive display screen, wherein each of the plurality of physical objects represents a node in a communication network, the interactive display screen is configured to display a topography of the communication network including at least a plurality of nodes, where each of the plurality of nodes represented by one of the plurality of physical objects is displayed beneath the respective physical object, and where open communication channels between nodes in the plurality of nodes are visually displayed on the interactive display screen; an input device interfaced with the interactive display screen is configured to receive a physical gesture performed by a user involving one or more of the plurality of physical objects; a transmitter interfaced with the interactive display screen is configured to transmit a signal to one of the one or more physical objects or an access point of the communication network causing manipulation of the communication network based on the physical gesture, and the interactive display screen is further configured to update the topography of the communication network based on the manipulation of the communication network in real-time.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 1A and 1B are block diagrams illustrating a high level system architecture for providing a physical, interactable display of a communication network using physical objects in accordance with exemplary embodiments.

Figure 2:
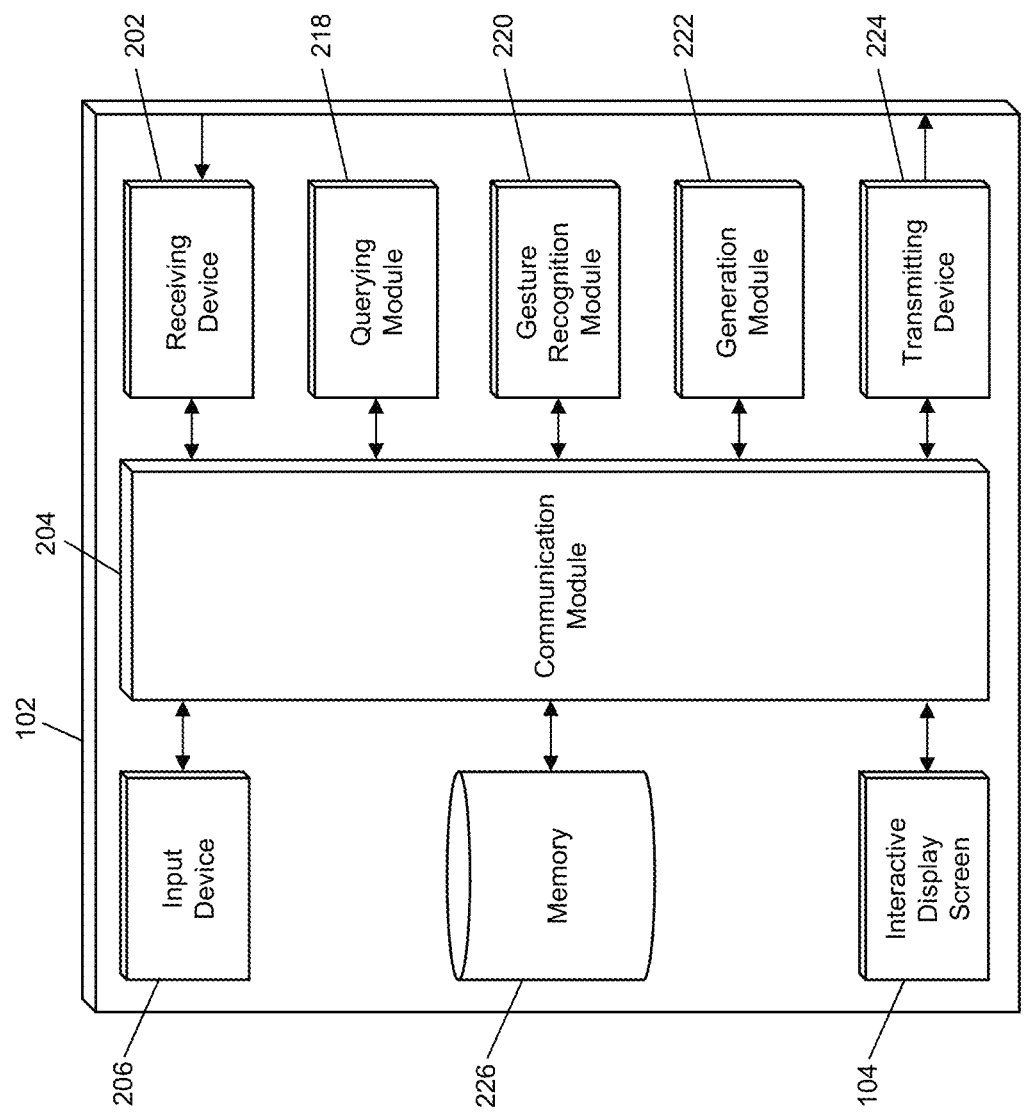
FIG. 2 is a block diagram illustrating the interactive display of the system of FIG. 1 for the display and manipulation of a communication network in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Physical Display and Manipulation of a Communication Network

FIG. 1A illustrates a system 100 for the physical display of a communication network that is interactable by a user through physical gestures and physical objects that are positioned on an interactive display.

The system 100 may include an interactive display 102. The interactive display 102, discussed in more detail below, may have an interactive display screen 104 interfaced therewith that is configured to display a visual representation of a communication network. The interactive display 102 may be any type of computing device or system that is specifically configured to perform the functions discussed herein, where the interactive display screen 104 may be any type of display suitable for performing the functions discussed herein, such as a liquid crystal display, light emitting diode display, thin film transistor display, capacitive touch display, etc. The visual representation may display a plurality of nodes in a communication network with lines or other visual markers that represent open communication channels between the nodes. The visual representation may thus display the topography of the communication network in a manner that is understandable to a viewer of the interactive display screen 104. The visual representation may also indicate any additional features and components of the communication network, where such features and components may be based on the type of communication network, topography used, type of nodes included in the communication network, etc.

In the example illustrated in FIG. 1A, the communication network may be comprised of three nodes 108, which includes a laptop computer 108a, a desktop computer 108b, and a router 108c. As in the illustrated example, physical objects 106 may be positioned on the interactive display screen 104 to represent the nodes 108 in the communication network. Each physical object 106 may be read by the interactive display as representing one of the nodes 108. In some cases, a physical object may be directly associated with a specific node 108. For instance, in one example, the physical object 106a may only be used to represent the laptop computer 108a on the physical display. In such an example, the physical object 106a may have a unique identifier stored therein that is readable by the interactive display 102 (e.g., via near field communication, radio frequency, Bluetooth, reading of a machine-readable code, etc.), where the unique identifier is directly associated with the laptop computer 108a. In other cases, a physical object 106 may be agnostic as to the node 108 which it represents, where the interactive display 102 may assign a node 108 to each such physical object 106, which may be done randomly, based on physical characteristics of the physical object 106 (e.g., larger physical objects 106 may be used to represent larger, in terms of physical size or bandwidth, nodes 108), or other suitable criteria. In some embodiments, a physical object 106 may itself be a node 108.

The interactive display 102 may read the physical positions of the physical objects 106 that are placed on the interactive display screen 104 using any suitable method, which may be dependent on the type of interactive display screen 104 used. For instance, if the interactive display screen 104 is a capacitive touch or other type of touch display, the positions of the physical objects 106 may be detected as touches on the display. See, e.g., U.S. Pat. No. 5,973,677 to Gibbons, herein incorporated by reference for is disclosure of touch screens. If the interactive display screen 104 itself does not read input, infrared lasers or other types of signals may be used to detect the physical positions of the physical objects 106 placed on the interactive display screen 104. See, e.g., U.S. Pat. No. 7,515,143 to Kearn et al., herein incorporated by reference for is disclosure of interactive display screens The interactive display screen 104 may display the visual representations of the nodes 108 in the communication network beneath the physical object 106 that is associated therewith. As illustrated in FIG. 1B, a circle 112a may be used as a visual representation of the node 108a that is being represented by the physical object 106a where it is positioned on the interactive display screen 104. As also illustrated in FIG. 1B, the interactive display screen 104 may display lines 110 that connect the circles 112 that represent the nodes 108, which may represent open communication channels between the nodes 108 in the communication network. In some embodiments, the lines 110 may have properties thereof that may represent properties of the communication channels that they represent. For instance, in the illustrated example, the width of the lines 110 may represent bandwidth used by the communication channel, where the channel between the desktop computer 108b and the router 108c uses more bandwidth than the communication channel between the desktop computer 108b and the laptop computer 108a. Additional properties of the lines 110 may be used to represent additional characteristics of the communication channels, such as arrows to indicate flows of information, types of lines to illustrate types of communication channels, properties to illustrate security levels of a communication channel, etc.

The interactive display 102 may be configured to read physical gestures performed by a user of the interactive display 102, where the physical gestures are used to manipulate the communication network and/or the visual representation thereof. A physical gesture may be read using an input device interfaced with the interactive display 102, which may be the interactive display screen 104 or a separate input device that is interfaced with the interactive display 102. See, e.g., U.S. Pat. No. 7,719,523 to Hillis, herein incorporated by reference for is disclosure of touch screens. The interactive display 102 may read the physical gesture, may identify the physical gesture as a registered command, and may perform an action based on the physical gesture. Physical gestures may be used to create communication channels, termination communication channels, add or remove nodes, increased or decrease bandwidth of a communication channel, change security types for a communication channel, or any other managerial or administrative aspect of the communication network. In some cases, the gesture may manipulate only the visual representation of the communication network that is displayed on the interactive display screen 104. See, e.g., U.S. Pat. No. 6,408,257 to Harrington, herein incorporated by reference for is disclosure of augmented reality displays that can use gestures as input.

In other cases, physical gestures may manipulate the visual representation as well as perform the corresponding manipulation to the real communication network. In such cases, the interactive display 102 may be configured to receive real-time information regarding the communication network, such as from one or more of the nodes 108. In some embodiments, the interactive display 102 may directly communicate with one of the nodes 108 using any suitable communication network and method. In other embodiments, a physical object 106 may be used as an intermediary for communication between the interactive display 102 and a node 108. For example, the physical object 106*c* may have a communication channel established with the router 108*c* and may forward data regarding the communication network to the interactive display 102 for use in the visual representation using a suitable communication method. In some such examples, communication channels involving a physical object 106 for use in the visual representation may be hidden in the visual representation or otherwise indicated in the visual representation.

When a physical gesture is read by the interactive display 102, the visual representation may be updated accordingly and, if the communication network itself is to be manipulated, the interactive display 102 may transmit a signal to a physical object 106 or a node 108, as applicable, to instruct the communication network to manipulate the communication network accordingly. For example, the user may "draw" a line between the physical objects 106*a* and 106*c* on the interactive display screen 104 using their finger, which the interactive display 102 may read and interpret as a gesture to establish a communication channel between the laptop computer 108*a* and the router 108*c*. The interactive display 102 may transmit a signal to one of the physical objects 106 or a node 108 to instruct the laptop computer 108*a* and router 108*c* to open a communication channel between the two devices, while the visual representation may display a new line 110 connecting the two circles beneath the physical objects 106*a* and 106*c*. In some cases, the line 110 may not be displayed until the communication channel has been established in the actual communication network. In some instances, the visual representation may display a visual indicating that the instruction has been sent to the network and is awaiting performance, such as a blinking line 110 that will turn solid once the communication network has informed the interactive display 102 of the establishing of the communication channel.

Gestures may thus be used by the user of the interactive display to manipulate the visual representation or communication network in any suitable manner. For instance, the user may draw lines between two physical objects 106 to establish a communication channel, may slice through a line 110 to terminate a communication channel, may pinch and slide a line 110 to increase or decrease bandwidth of the communication channel, may physically move a physical object 106 to a new physical position on the interactive display screen 104 to change the visual representation, may place a new physical object 106 on the interactive display screen 104 to add a new node 108 to the communication network (e.g., where the new node 108 may be one that is directly associated with that physical object 106, or may be selected by the user from a list of potential nodes 108 detected by the communication network), may remove a physical object 106 to remove the corresponding node 108 from the communication network (e.g., or only the visual display, as may be indicated by the user), etc. In some instances, outside connections to the communication network may be represented by lines 110 that connect from a physical object 106 to the edge of the interactive display screen 104, which may be interacted with by the user.

In some cases, some physical gestures may be performed by the user for only manipulation of the visual representation, such as to provide the user with more information regarding the communication network. For example, the interactive display screen 104 may display a slider that may be interacted with by the user to slow down or speed up time as represented by the visual representation. For instance, in such an example, the visual representation may be a simulation of the communication network, where use of the slider may adjust the speed of the simulation accordingly. In another example, the user may pinch and slide empty space in the interactive display 104 to zoom in or out of the visual representation. In some embodiments, the interactive display 102 may be configured to physically move the physical objects 106 in accordance with the zoom (e.g., moving the physical objects 106 further apart when zooming in) using any suitable mechanism. In other embodiments, the circles 112 representing the nodes 108 in the visual representation may move from beneath the physical objects 106 in the representation when a zoom is used, and may return to beneath the physical objects 106 at the standard magnification.

In some embodiments, the interactive display 102 may use augmented reality for the visual representation. In such embodiments, the user may have a separate computing device that is used to view the interactive display screen 104, which may reveal a three-dimensional visual representation of the communication network. In these embodiments, physical gestures may be read in the three-dimensional space represented by the augmented reality display. In some cases, the interactive display 102 may use holography to accomplish or represent a three-dimensional visual representation on the interactive display screen. Any other technology that may be used to provide a visual representation utilizing the physical objects 106 that enables a user to make physical gestures for manipulation of the visual representation may be suitable.

The methods and systems discussed herein enable a visual representation of a communication network to be made through the use of an interactive display 102 and physical objects 106 positioned on an interactive display screen 104 thereof. The use of physical objects 106 and a large-format display may enable a user to visualize a communication network topography that may be not as easily understood without such a visual representation. In cases where there may be dozens or hundreds of nodes 108 (where all or only a portion of the nodes 108 may have physical objects 106 positioned on the interactive display screen 104 associated therewith), the use of a visual representation may significantly increase the ability for an unsophisticated user to comprehend the communication network and flow of information thereof. The reading of physical gestures to manipulate the visual representation may provide for a more intuitive and accessible learning experience for users. In cases where such actions may manipulate the communication network itself, users that are otherwise unknowledgeable regarding administration of a communication network may be able to perform such functions through use of the visual representation. As a result, the methods and systems discussed herein provide for easier designing, debugging, and visualization of even the most complicated communication networks and executions of distributed software applications.

Interactive Display

FIG. 2 illustrates an embodiment of an interactive display 102 in the system 100. It will be apparent to persons having skill in the relevant art that the embodiment of the interactive display 102 illustrated in FIG. 2 is provided as illustration only and may not be exhaustive to all possible configurations of the interactive display 102 suitable for performing the functions as discussed herein. For example, the computer system 500 illustrated in FIG. 5 and discussed in more detail below may be a suitable configuration of the interactive display 102.

The interactive display 102 may include a receiving device 202. The receiving device 202 may be configured to receive data over one or more networks via one or more network protocols. In some instances, the receiving device 202 may be configured to receive data from physical objects 106, nodes 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by physical objects 106 that are superimposed or otherwise encoded with positioning information and/or information regarding represented nodes 108, such as unique identifiers associated therewith. The receiving device 202 may also be configured to receive data signals electronically transmitted by physical objects 106 and nodes 108 that are superimposed or otherwise encoded with communication network information, such as information regarding network topography, communication channels, bandwidth, connected nodes 108, available nodes 108, external communication channels, security types and levels, etc.

The interactive display 102 may also include a communication module 204. The communication module 204 may be configured to transmit data between modules, engines, databases, memories, and other components of the interactive display 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the interactive display 102 and external components of the interactive display 102, such as externally connected databases, display devices, input devices, etc. The interactive display 102 may also include a processing device. The processing device may be configured to perform the functions of the interactive display 102 discussed herein as will be apparent to persons having skill in the relevant art. In some embodiments, the processing device may include and/or be comprised of a plurality of engines and/or modules specially configured to perform one or more functions of the processing device, such as a querying module 218, gesture recognition module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The interactive display 102 may also include or be otherwise interfaced with one or more input devices 206. The input devices 206 may be internal to the interactive display 102 or external to the interactive display 102 and connected thereto via one or more connections (e.g., wired or wireless) for the transmission of data to and/or from. The input devices 206 may be configured to receive input from a user of the interactive display 102, which may be provided to another module or engine of the interactive display 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive physical gestures performed by a user. In some cases, the input device 206 may be configured to interpret the physical gesture, such as for matching to a stored command for use in performing the functions discussed herein. In other cases, the input device 206 may forward gesture information to another module or engine of the interactive display 102 for interpretation thereby.

The interactive display 102 may also include or be otherwise interfaced with the interactive display screen 104. The interactive display screen 104 may be internal to the interactive display 102 or external to the interactive display 102 and connected thereto via one or more connections (e.g., wired or wireless) for the transmission of data to and/or from. The interactive display screen 104 may be configured to display data to a user of the interactive display 102. The interactive display screen 104 may be any type of display suitable for displaying data as part of the functions discussed herein, such as a liquid crystal display, light emitting diode display, thin film transistor display, capacitive touch display, cathode ray tube display, light projection display, etc. In some instances, the interactive display 102 may include multiple display screens 104. The interactive display screen 104 may be configured to, for example, display a visual representation of a communication network and distributed software applications incorporating physical objects 106. In some cases, the interactive display screen 104 may be configured to read positions of the physical objects 106 on the interactive display screen 104 for use in the visual representation of the nodes 108 associated therewith.

The interactive display 102 may include a querying module 218. The querying module 218 may be configured to execute queries on databases to identify information. The querying module 218 may receive one or more data values or query strings, and may execute a query string based thereon on an indicated database, such as a memory 226, to identify information stored therein. The querying module 218 may then output the identified information to an appropriate engine or module of the interactive display 102 as necessary. The querying module 218 may, for example, execute a query on the memory 226 to read communication network information received from physical objects 106 or nodes 108 for use in generating the visual representation of the communication network.

The interactive display 102 may also include a gesture recognition module 220. The gesture recognition module 220 may be configured to receive data regarding movement of a user captured by an input device 206 as a physical gesture, and to identify a potential physical gesture performed by the user based on the movement data. The gesture recognition module 220 may be configured to identify registered physical gestures (e.g., stored in the memory 226 as identified using the querying module 218) and to identify if the user movement matches any registered physical gesture using the movement data. In cases where a physical gesture is matched to the user movement, the gesture recognition module 220 may also identify, based on the movement data and other data of the visual representation, such as the positions of the physical objects 106, any nodes 108 that may be involved in or otherwise affected by the physical gesture. Such information obtained by the gesture recognition module 220 may be output to another module or engine of the interactive display 102.

The interactive display 102 may also include a generation module 222. The generation module 222 may be configured to generate data for use by the interactive display 102 in performing the functions discussed herein. The generation module 222 may be configured to receive instructions as input, generate data as instructed, and output the generated data to another module or engine of the interactive display 102. The generation module 222 may be provided with data to be used in the generation as part of the input, and/or may be configured to identify additional data to be used in the generation, such as by instructing the querying module 218 to identify such data. The generation module 222 may be configured to, for example, generate data signals that are to be transmitted to physical objects 106 or nodes 108 that contain instructions for manipulation of the communication network based on a performed physical gesture. The generation module 222 may also be configured to generate the visual representation for display on the interactive display screen 104 based on data received regarding the communication network, and may be configured to update the visual representation in real-time based on updates to the received data and gestures performed by the user of the interactive display.

The interactive display 102 may also include a transmitting device 224. The transmitting device 224 may be configured to transmit data over one or more networks via one or more network protocols. In some instances, the transmitting device 224 may be configured to transmit data to physical objects 106, nodes 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to physical objects 106 and nodes 108 that are superimposed or otherwise encoded with requests for identifiers or data regarding the communication network, or instructions for manipulation of the communication network based on physical gestures performed by a user of the interactive display 102.

The interactive display 102 may also include a memory 226. The memory 226 may be configured to store data for use by the interactive display 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the interactive display 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, communication network data, communication channel information, information regarding connected, disconnected, or available nodes, node 108 and physical object 106 identifiers, registered physical gestures, positioning information regarding physical objects 106, etc.

Process for Manipulation of a Communication Network Through Physical Gestures

Figure 3:
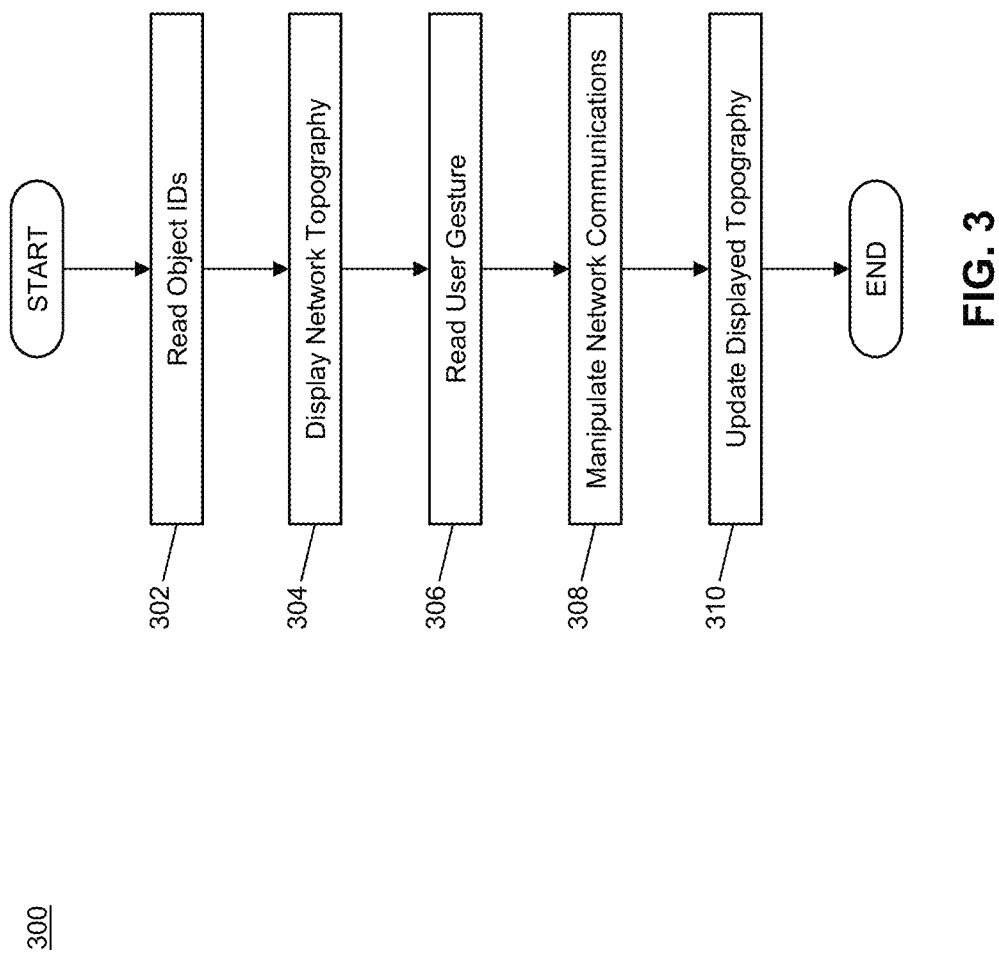
FIG. 3 is a flow diagram illustrating a process for displaying and manipulating a communication network using physical objects and gestures as performed by the interactive display of FIG. 2 in accordance with exemplary embodiments.

FIG. 3 illustrates an example process 300 executed by the interactive display 102 for the manipulation of a communication network through a visual representation and physical gestures in the system 100 of FIG. 1.

In step 302, the receiving device 202 of the interactive display 102 may read identifiers of each of the physical objects 106 positioned on the interactive display screen 104. For instance, each physical object 106 may transmit an object identifier stored therein to the interactive display 102 using near field communication, which may be read by the receiving device 202 thereof, where each object identifier may be associated with a node 108 in the communication network. In step 304, the generation module 222 of the interactive display 102 may generate a visual representation of the communication network including each of the nodes 108 for which there is a physical object 106 present, where the visual representation may be displayed by the interactive display screen 104 interfaced with the interactive display 102. The visual representation may be displayed such that a circle 112 representing each node 108 is positioned beneath the physical object 106 corresponding to the respective node 108 and where lines 110 connect each of the circles 112 for each open communication channel between nodes 108 in the communication network.

In step 306, the input device 206 of the interactive display 102 may read a physical gesture performed by a user of the interactive display. In some cases, the physical gesture may be performed on the surface of the interactive display screen 104, such as in cases where the interactive display screen 104 is a capacitive touch or other input-enabled display. As part of the reading of the physical gesture, the gesture recognition module 220 may match the performed physical gesture to a registered physical gesture to interpret a manipulation instruction for the communication network as performed by the user.

In step 308, the transmitting device 224 of the interactive display 102 may electronically transmit a signal (e.g., generated by the generation module 222 based on the recognition performed by the gesture recognition module 220) to a physical object 106 and/or node 108 in the communication network requesting manipulation of the communication network based on the performed physical gesture. For instance, the signal may be transmitted to a node 108 requesting that the node 108 establish a new communication channel with another node 108 based on the user's performed physical gesture. The communication network may receive the instruction and may manipulate the communication network accordingly. The communication network may communicate updates to the interactive display 102 as part of the real-time connection between the interactive display 102 and a node 108 or other device in the communication network. In step 310, the generation module 222 of the interactive display may generate an updated visual representation based on the updates of the communication network as a result of the performed manipulation, which may be displayed on the interactive display screen 104.

Figure 4:
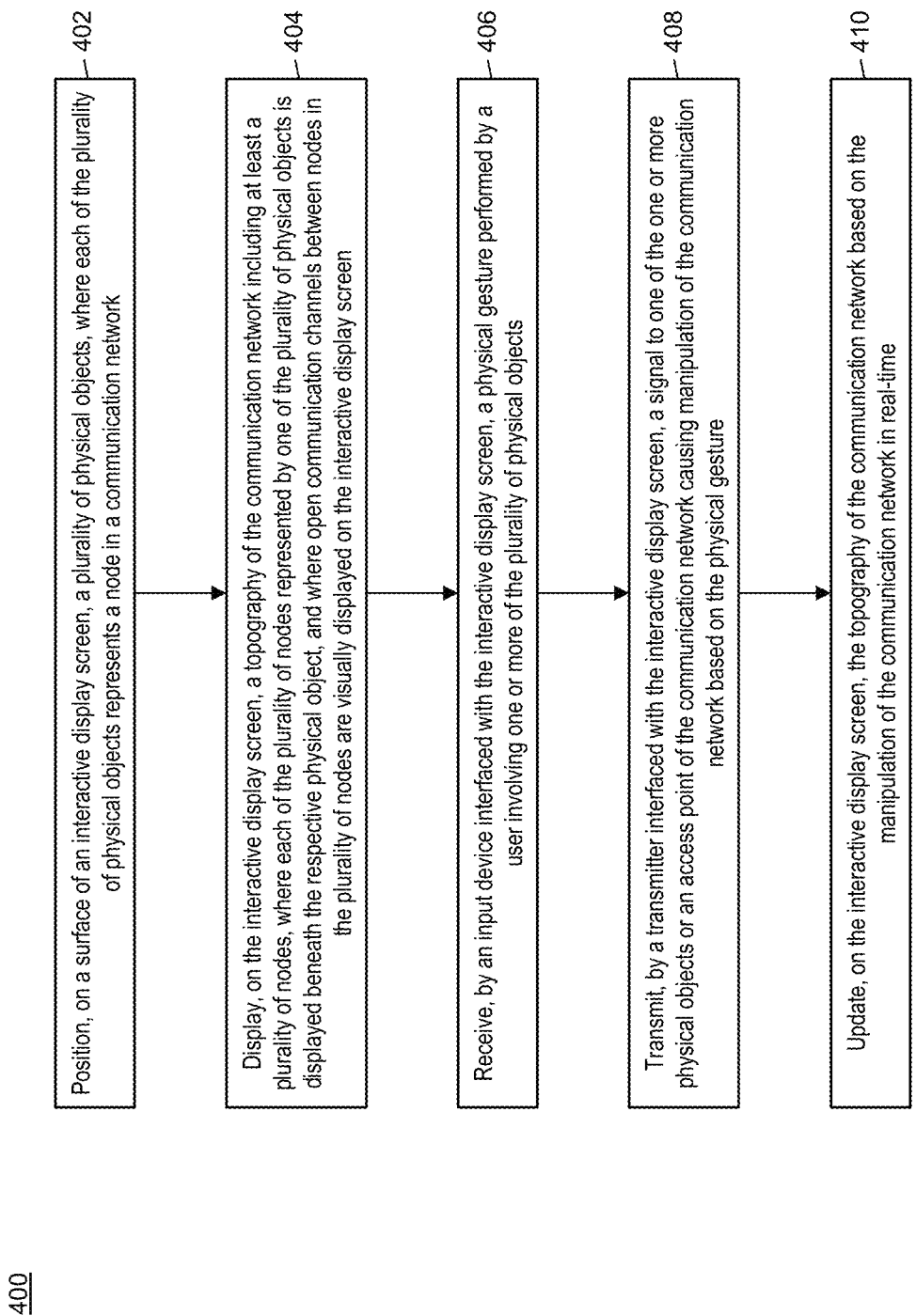
FIG. 4 is a flow chart illustrating an exemplary method for physically displaying and manipulating a communication network through physical objects and an interactive display in accordance with exemplary embodiments.

Exemplary Method for Physical Display and Manipulation of a Communication Network FIG. 4 illustrates a method 400 for physically displaying and manipulating a communication network through physical objects and an interactive display.

In step 402, a plurality of physical objects (e.g., physical objects 106) may be positioned on a surface of an interactive display screen (e.g., the interactive display 102, interactive display screen 104, etc.), where each of the plurality of physical objects represents a node in a communication network. In step 404, a topography of the communication network including at least a plurality of nodes (e.g., nodes 108) may be displayed on the interactive display screen, where each of the plurality of nodes represented by one of the plurality of physical objects is displayed beneath the respective physical object, and where open communication channels between nodes in the plurality of nodes are visually displayed on the interactive display screen.

In step 406, a physical gesture performed by a user involving one or more of the plurality of physical objects may be received by an input device interfaced with the interactive display screen. In step 408, a signal may be transmitted by a transmitter (e.g., the transmitting device 224) interfaced with the interactive display screen to one of the one or more physical objects or an access point (e.g., node 108) of the communication network causing manipulation of the communication network based on the physical gesture. In step 410, the topography of the communication network may be updated in real time on the interactive display screen based on the manipulation of the communication network.

In one embodiment, manipulation of the communication network may include the establishing of a new communication channel between nodes represented by the two of the plurality of physical objects. In some embodiments, manipulation of the communication network may include terminating a communication channel between nodes represented by the two of the plurality of physical objects. In one embodiment, manipulation of the communication network may include increasing or decreasing bandwidth available in a communication channel between nodes represented by the two of the plurality of physical objects.

In some embodiments, the method 400 may further include: receiving, by the input device interfaced with the interactive display screen, a second physical gesture performed by the user involving an interface element displayed on the interactive display screen; and manipulating, on the interactive display screen, a passage of time depicted in the displayed topography of the communication network based on the second physical gesture. In one embodiment, at least one of the plurality of physical objects may be a computing device operating as the represented node in the communication network. In some embodiments, at least one of the plurality of physical objects may be the access point of the communication network. In one embodiment, the visual display of open communication channels between nodes in the display topography may indicate a used or available bandwidth for the respective communication channel based on a width of the visual display.

Computer System Architecture

Figure 5:
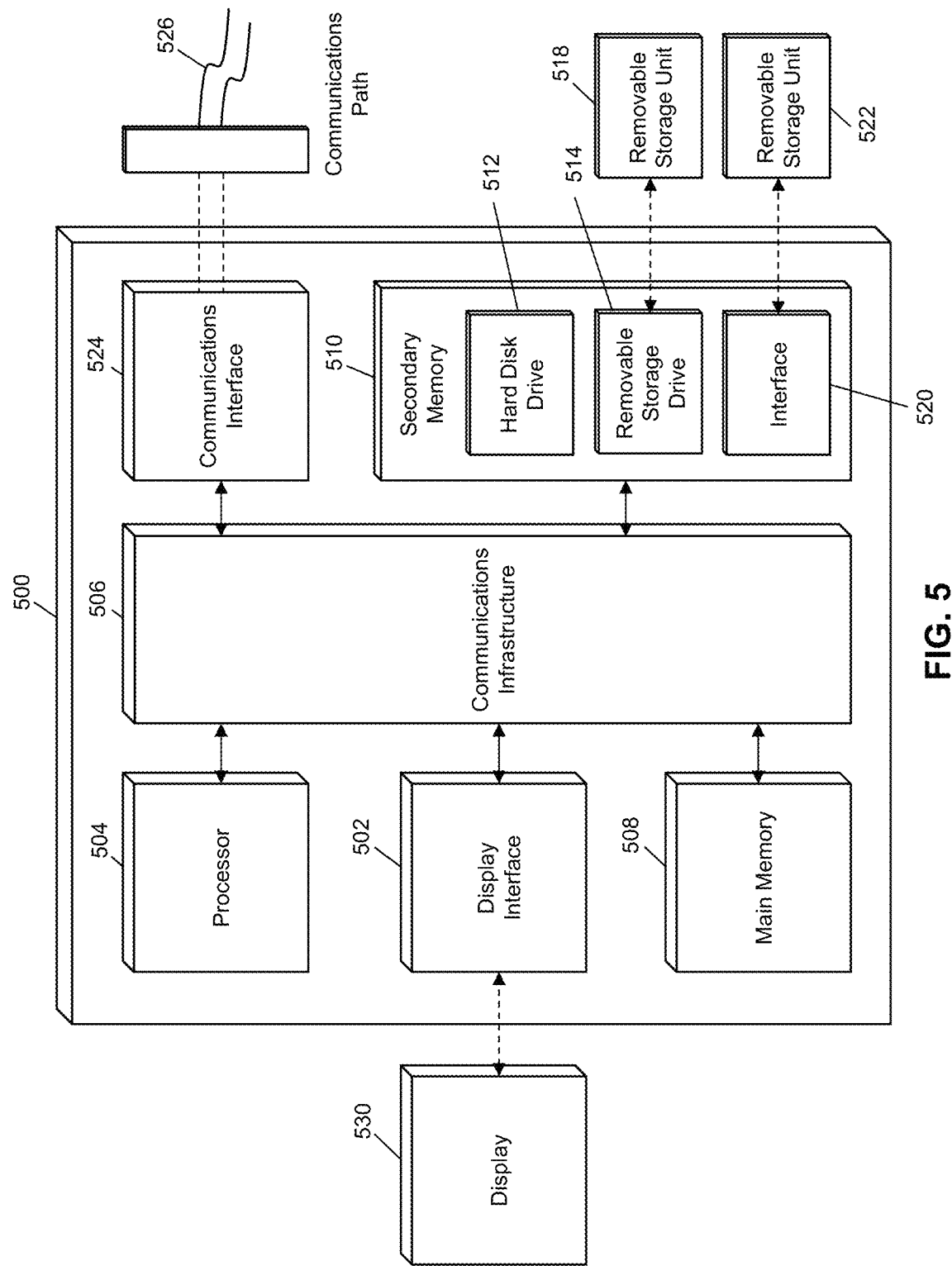
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the interactive display 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for physically displaying and manipulating a communication network through physical objects and an interactive display. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for physically displaying and manipulating a communication network through physical objects and an interactive display, comprising:
    positioning, on a surface of an interactive display screen, a plurality of physical objects, wherein each physical object of the plurality of physical objects is directly associated with a specific node in a communication network;
    detecting, by the interactive display screen, positions of the plurality of physical objects positioned on the surface of the interactive display screen;
    in response to detecting the positions of the plurality of physical objects, displaying, on the interactive display screen, a topography of the communication network including a plurality of nodes, wherein (i) the plurality of nodes includes at least an associated node for each physical object positioned on and detected by the interactive display screen, (ii) each associated node is displayed beneath the physical object of the plurality of physical objects with which it is directly associated, and (iii) open communication channels between nodes in the plurality of nodes are visually displayed on the interactive display screen;
    receiving, by an input device interfaced with the interactive display screen, a physical gesture performed by a user involving one or more of the plurality of physical objects;
    transmitting, by a transmitter interfaced with the interactive display screen, a signal to (i) one of the one or more physical objects or (ii) one of the nodes of the communication network causing manipulation of the communication network based on the physical gesture; and
    updating, on the interactive display screen, the topography of the communication network based on the manipulation of the communication network in real-time.

2. The method of claim 1, wherein manipulation of the communication network includes the establishing of a new communication channel between nodes represented by two physical objects of the plurality of physical objects.

3. The method of claim 1, wherein manipulation of the communication network includes terminating a communication channel between nodes represented by two physical objects of the plurality of physical objects.

4. The method of claim 1, wherein manipulation of the communication network includes increasing or decreasing bandwidth available in a communication channel between nodes represented by two physical objects of the plurality of physical objects.

5. The method of claim 1, further comprising:
    receiving, by the input device interfaced with the interactive display screen, a second physical gesture performed by the user involving an interface element displayed on the interactive display screen; and
    manipulating, on the interactive display screen, a passage of time depicted in the displayed topography of the communication network based on the second physical gesture.

6. The method of claim 1, wherein at least one of the plurality of physical objects is a computing device operating as the represented node in the communication network.

7. The method of claim 1, wherein at least one of the plurality of physical objects is an access point of the communication network.

8. The method of claim 1, wherein the visual display of open communication channels between nodes in the display topography indicates a used or available bandwidth for the respective communication channel based on a width of the visual display.

9. A system for physically displaying and manipulating a communication network through physical objects and an interactive display, comprising:
    an interactive display screen having a surface; and
    a plurality of physical objects positioned on the surface of the interactive display screen, wherein
    each physical object of the plurality of physical objects is directly associated with a specific node in a communication network,
    the interactive display screen is configured to detect positions of the plurality of physical objects positioned on the surface of the interactive display screen,
    the interactive display screen is configured to display, in response to detecting the positions of the plurality of physical objects, a topography of the communication network including a plurality of nodes, wherein (i) the plurality of nodes includes at least an associated node for each physical object positioned on an detected by the interactive display screen, (ii) each associated node is displayed beneath the physical object of the plurality of physical objects with which it is directly associated, and (iii) open communication channels between nodes in the plurality of nodes are visually displayed on the interactive display screen;
    an input device interfaced with the interactive display screen is configured to receive a physical gesture performed by a user involving one or more of the plurality of physical objects;
    a transmitter interfaced with the interactive display screen is configured to transmit a signal to one of the one or more physical objects or (ii) one of the nodes of the communication network causing manipulation of the communication network based on the physical gesture, and
    the interactive display screen is further configured to update the topography of the communication network based on the manipulation of the communication network in real-time.

10. The system of claim 9, wherein manipulation of the communication network includes the establishing of a new communication channel between nodes represented by two physical objects of the plurality of physical objects.

11. The system of claim 9, wherein manipulation of the communication network includes terminating a communication channel between nodes represented by two physical objects of the plurality of physical objects.

12. The system of claim 9, wherein manipulation of the communication network includes increasing or decreasing bandwidth available in a communication channel between nodes represented by two physical objects of the plurality of physical objects.

13. The system of claim 9, wherein
    the input device interfaced with the interactive display screen is further configured to receive a second physical gesture performed by the user involving an interface element displayed on the interactive display screen, and the interactive display screen is further configured to manipulate a passage of time depicted in the displayed topography of the communication network based on the second physical gesture.

14. The system of claim 9, wherein at least one of the plurality of physical objects is a computing device operating as the represented node in the communication network.

15. The system of claim 9, wherein at least one of the plurality of physical objects is an access point of the communication network.

16. The system of claim 9, wherein the visual display of open communication channels between nodes in the display topography indicates a used or available bandwidth for the respective communication channel based on a width of the visual display.

* * * * *